July 7, 1959 J. E. HECKETHORN 2,893,094
STRAP FASTENERS
Filed Jan. 28, 1957
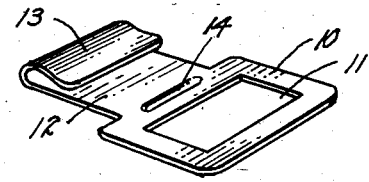
Fig. 1
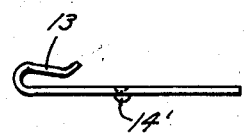
Fig. 2
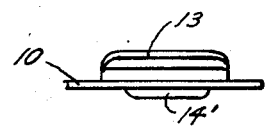
Fig. 3
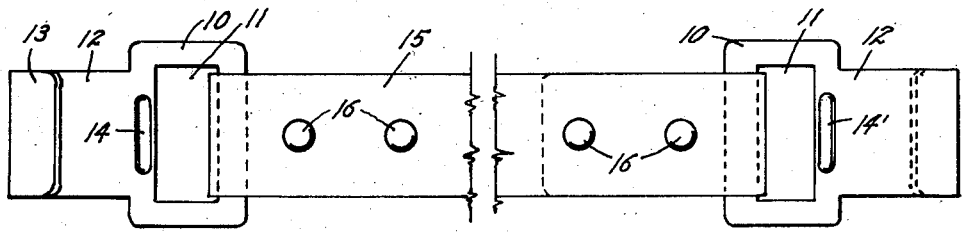
Fig. 4
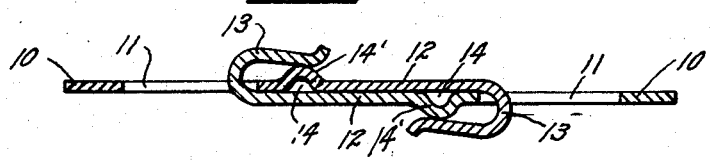
Fig. 5
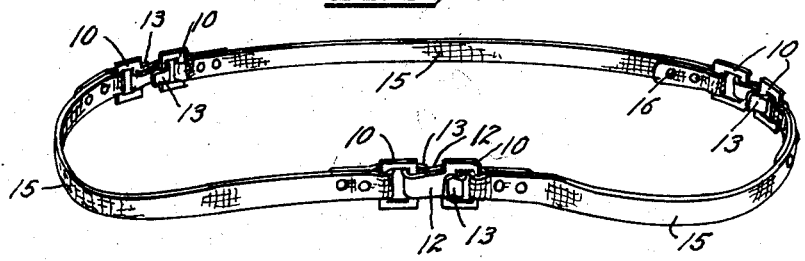
Fig. 6
INVENTOR.
JOHN E. HECKETHORN
BY
ATTORNEY

2,893,094
STRAP FASTENERS

John E. Heckethorn, Denver, Colo., assignor to Heckethorn Manufacturing & Supply Company, Littleton, Colo., a corporation of Colorado Application January 28, 1957, Serial No. 636,657

1 Claim. (Cl. 24—226)

This invention relates to a fastening device for straps, and more particularly to a strap fastener, one of which may be applied to each extremity of a strap for securing the two extremities thereof together to form an endless strap, or for attaching the extremities to the extremities of other straps for forming straps of any desired length.

Another object of the invention is to so construct the fastener that it will snap into place in a similar fastener and retain itself in the attached position to avoid accidental unfastening, and to so construct the fastener that it can be cheaply and easily manufactured from sheet metal by a simple stamping operation.

A further object is to provide a two element snap fastener, the two elements of which are identical so that they will be interchangeable and the cost of a mating piece will be eliminated.

Other objects and advantages reside in the detail construction of the invention, which is designed for simplicity, economy and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a perspective view of the improved strap fastener;

Fig. 2 is a side view thereof;

Fig. 3 is an end view thereof;

Fig. 4 illustrates one of the improved fasteners attached to each extremity of a common strap;

Fig. 5 is an enlarged, longitudinal section through two of the fasteners in the attached or joined position; and Fig. 6 is a perspective view illustrating a plurality of straps secured together in an endless band by means of the improved fastener.

The improved fastener is designed for use on elongated, flexible straps of any material, such as woven fabric, leather, plastic, rubber, etc., such as illustrated at 15.

The fastener is stamped from sheet metal to form a transversely elongated rectangular portion 10 having a similarly elongated rectangular openings 11. A tab portion 12, of slightly less width than the length of the rectangular openings 11, extends from one side of the rectangular portion 10 and is turned upwardly and inwardly at its outer extremity to form a relatively wide locking hook 13.

An elongated indentation 14 is formed in the upper side of the rectangular portion 10 at one side of the opening 11. The indentation is positioned in medial alignment with the tab 12 and extends transversely of the axis of the latter and forms an elongated locking ridge 14' on the under or opposite face of the fastener.

The strap to which the fasteners are to be applied, indicated at 15, is passed through the rectangular opening 11, and about the side of the portion 10 opposite to the tab 12, and the extremity of the strap is secured in place in any desired manner, such as by means of attachment rivets 16. One of the improved fasteners is similarly applied to each extremity of the strap 15 in opposed relation, that is, with the hook 13 of one fastener on the side opposite to the hook 13 of the other fastener, as shown in Fig. 4.

The two fasteners on the same strap can be secured together by extending the hook of each fastener through the rectangular opening 11 of the other fastener, then drawing the two fasteners toward each other until each locking hook 13 passes over the locking ridge 14' of the other fastener. The two fasteners will then be affixed together in the postion of Fig. 5, with the hooks 13 resiliently engaging the ridges 14'. It will be noted that the hooks 13 incline toward the tab portions 12 so that they will be resiliently flexed outwardly as they are pulled over the ridges to firmly and frictionally engage the latter.

While the fasteners are designed for attaching the two extremities of a single strap together, or for attaching a plurality of straps together, they can be used for other purposes, such as for strapping seat cushions to springs by simply hooking the hooks 13 over the cushion-supporting springs.

It will be noted that when in the fastened position, the hooks 13 cannot slide sidewardly from the ridges 14', since each hook is firmly positioned in the rectangular opening 11 of the opposite fastener. The width of the rectangular opening is such as to allow sufficient clearance to enable the hook of a second fastener to be moved into and out of engagement with the ridge 14' of the first fastener.

While the embodiment illustrated discloses an elongated indentation at 14 forming an elongated locking ridge 14', the same objects could be obtained by placing one or more dimple-like indentations in the upper side of the rectangular portion 10 at one side of the opening 11 to form projections on the opposite side to accomplish the same purpose as the elongated locking ridge 14'.

While a specific form of the improvement has been described and illustrated herein, it is to be understood that the same may be varied within the scope of the appended claim, without departing from the spirit of the invention.

Having thus described the invention, what is claimed and desired secured by Letters Patent is:

A pair of interlocked strap fasteners for attaching two strap extremities together, the fasteners of the pair being formed from sheet metal and being exactly similar in construction and each comprising: a relatively wide, substantially rectangular portion provided with a rectangular opening similar in shape to the rectangular portion and occupying the major portion of the area of said portion; a tab portion extending forwardly from the middle of one side of said rectangular portion and lying in the plane of the latter, the said tab portion being narrower than the width of said rectangular opening; a hook formed on the outer extremity of said tab portion and extending upwardly and inwardly over one face of the latter so that two of said fasteners may be engaged by passing the hook of each fastener through the rectangular opening of the other fastener, with the tab portions of the fasteners lying in substantially parallel relation; a ridge resulting from an indentation in the rectangular portion of each fastener said ridge being positioned adjacent the tab portion and extending transversely of the axis of the tab portion, the ridge of each fastener being spaced away from the hook of the fastener so as not to be covered by the hook of that fastener, the hook of each fastener extending over and frictionally engaging the ridge on the other fastener and acting to retain the pair of fasteners in interlocked relation.

References Cited in the file of this patent

UNITED STATES PATENTS

| | | |
|---|---|---|
| 142,527 | Starr | Sept. 2, 1873 |
| 771,659 | Nichols | Oct. 4, 1904 |
| 1,107,750 | Boye | Aug. 18, 1914 |
| 1,600,279 | Epstein | Sept. 21, 1926 |

FOREIGN PATENTS

| | | |
|---|---|---|
| 232,124 | Great Britain | Apr. 16, 1925 |